United States Patent
Yeskel et al.

(10) Patent No.: US 8,924,493 B1
(45) Date of Patent: Dec. 30, 2014

(54) PRIORITIZED NOTIFICATIONS IN A SOCIAL NETWORK

(75) Inventors: Zachary Yeskel, San Francisco, CA (US); Balaji Srinivasan, Fremont, CA (US); Brett Rolston Lider, San Francisco, CA (US); Alison Boncha, San Francisco, CA (US); Boris Mazniker, San Francisco, CA (US); Andrew A. Bunner, Belmont, CA (US); Gregory Matthew Marra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 13/570,171

(22) Filed: Aug. 8, 2012

Related U.S. Application Data

(60) Provisional application No. 61/609,240, filed on Mar. 9, 2012.

(51) Int. Cl.
*G06F 15/16* (2006.01)
*H04L 12/24* (2006.01)
*G06F 9/54* (2006.01)

(52) U.S. Cl.
CPC ............ *G06F 9/542* (2013.01); *H04L 41/5051* (2013.01)
USPC ............................ 709/206; 709/219; 719/318

(58) Field of Classification Search
CPC ............................ G06F 9/542; H04L 41/5051
USPC ......... 709/204, 206, 207, 217, 219, 223, 224; 719/318
See application file for complete search history.

(56) References Cited

U.S. PATENT DOCUMENTS

| | | | |
|---|---|---|---|
| 7,260,610 B2 * | 8/2007 | Grooters et al. | 709/207 |
| 7,822,702 B2 * | 10/2010 | Bodin et al. | 706/62 |
| 2012/0124477 A1 * | 5/2012 | Edgar et al. | 715/738 |
| 2012/0323933 A1 * | 12/2012 | He et al. | 707/749 |
| 2013/0198685 A1 * | 8/2013 | Bernini et al. | 715/800 |
| 2013/0222133 A1 * | 8/2013 | Schultz et al. | 340/539.13 |

* cited by examiner

*Primary Examiner* — Viet Vu
(74) *Attorney, Agent, or Firm* — McDermott Will & Emery LLP

(57) ABSTRACT

The disclosed subject matter relates to systems, methods, and machine-readable media for ordering notifications for display in a social networking environment. One example system is configured to obtain a set of notifications for a user, wherein each notification in the set of notifications is generated in response to an event in a social network and, for each notification in the set of notifications, determine an event type associated with the notification and calculate a priority score for the notification based on the event type associated with the notification. The system is further configured to display the set of notifications based on the priority score for each notification in the set of notifications.

18 Claims, 5 Drawing Sheets

100

PRIORITIZED NOTIFICATIONS IN A SOCIAL NETWORK

RELATED APPLICATION

This application claims priority to U.S. provisional patent application 61/609,240, filed on Mar. 9, 2012, "PRIORITIZED NOTIFICATIONS IN A SOCIAL NETWORK," the entire contents of which are herein incorporated by reference in its entirety.

BACKGROUND

The present disclosure relates to the prioritization of notifications and, in particular, to displaying a prioritized set of notifications in a social networking environment.

Some social networking services may allow users to form associations with one another. For example, a social networking service may allow a user to create a group associated with the user, such as a social circle or social graph, and add other users to the group. The associations may be formed based on a user's personal contacts, professional contacts, or a combination of these. The associations may also be formed around users that share a common interest or a common characteristic. These associations can be stored within a social graph on one or more social networking servers. Such user associations can be defined on a user-to-user basis, or as a group of users associated through membership with a group.

The social networking services may enable users to share information with members of one or more social graphs in the social network. Users may also receive notifications from various entities in the social network such as other users, other users in social graphs, groups, or other entities.

SUMMARY

The disclosed subject matter relates to a system for prioritizing notifications for display in a social networking environment. The system may include one or more processors and a machine-readable medium comprising instructions stored therein, which when executed by the one or more processors, cause the one or more processors to perform operations. The operations may include obtaining a first content item and a second content item for a user, determining a first event type associated with the first content item based on a first event in a social network, determining a second event type associated with the second content item based on a second event in the social network, comparing the first event type for the first content item with the second event type for the second content item, prioritizing the first content item and the second content item based on the comparing, and displaying the first content item and the second content item based on the prioritizing.

These and other embodiments can include one or more of the following features. According to one aspect, the first content item and the second content item may be notifications.

According to other aspects, the prioritizing of the first content item and the second content item may include calculating a priority score for the first content item and the second content item.

According to other aspects, the first content item is associated with an entity and the operations may further include calculating an affinity score for the first content item that measures the social affinity between the user and the entity, wherein the priority score for the first content item is calculated based on the affinity score for the first content item.

According to other aspects, the operations may further include determining that the first event and the second event in the social network have occurred and generating the first content item and the second content item in response to the determining.

The disclosed subject matter also relates to a machine-implemented method for prioritizing notifications for display in a social networking environment. The method may include obtaining a set of notifications for a user, wherein each notification in the set of notifications is generated in response to an event in a social network and, for each notification in the set of notifications, determining an event type associated with the notification and calculating a priority score for the notification based on the event type associated with the notification. The method may further include displaying the set of notifications based on the priority score for each notification in the set of notifications.

These and other embodiments can include one or more of the following features. According to one aspect, the displaying of the set of notifications includes ranking the set of notifications based on the priority score for each notification and displaying the set of notifications according to the ranking.

According to other aspects, the method may further include removing a notification from the set of notifications based on the event type of the notification.

According to other aspects, at least one notification in the set of notifications may be associated with an entity.

According to other aspects, the method may further include calculating a social affinity score for the at least one notification associated with the entity, wherein the social affinity score measures the social affinity between the user and the entity and wherein the priority score for the at least one notification is further calculated based on the affinity score for the notification.

According to other aspects, the social affinity score for the at least one notification may be based on at least one of user information, user preferences, entity information, and relationship information between the user and the entity.

According to other aspects, the relationship information may include an indication as to whether or not the user has ever commented on a post made by the entity.

According to other aspects, the relationship information may include an indication as to whether or not the entity has ever commented on a post made by the user.

According to other aspects, the relationship information may include at least one of a number of contacts the user has with the entity, an indication of whether the user and the entity know each other, whether the user and the entity have similar demographic information.

According to other aspects, the event type may be defined based on at least one of a form of the event, content associated with the event, a location associated with the event, a prominence level associated with the event, or a social affinity level.

The disclosed subject matter also relates to a machine-readable medium comprising instructions stored thereon, which when executed by a machine, cause the machine to perform operations for ordering notifications for display in a social networking environment. The operations may include obtaining a set of notifications for a user, wherein each notification in the set of notifications is associated with a social affinity score, prioritizing the set of notifications based on the social affinity score associated with each notification in the set of notifications, and displaying the set of notifications based on the prioritization of the set of notifications.

These and other embodiments can include one or more of the following features. According to one aspect, the machine-readable medium may configured to perform the operations including determining that a notification triggering event associated with the user has occurred, generating a notification for the notification triggering event, and including the notification in the set of notifications for the user. According to one aspect, the operations may include calculating the affinity score for each notification in the set of notifications.

According to one aspect, each notification in the set of notifications may be associated with a timestamp and a event type and the priority score may be further calculated based on at least one of the timestamp and the event type associated with the notification.

These and other embodiments may provide one or more of the following advantages. A user may be provided with prioritized notifications such that the most important notifications, the most useful notifications, or the notifications of greatest interest to the user may be easily identified (e.g., these notifications may be presented first, in a prioritized area, or with a visual indicator indicating the heightened priority).

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative and not restrictive in nature.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
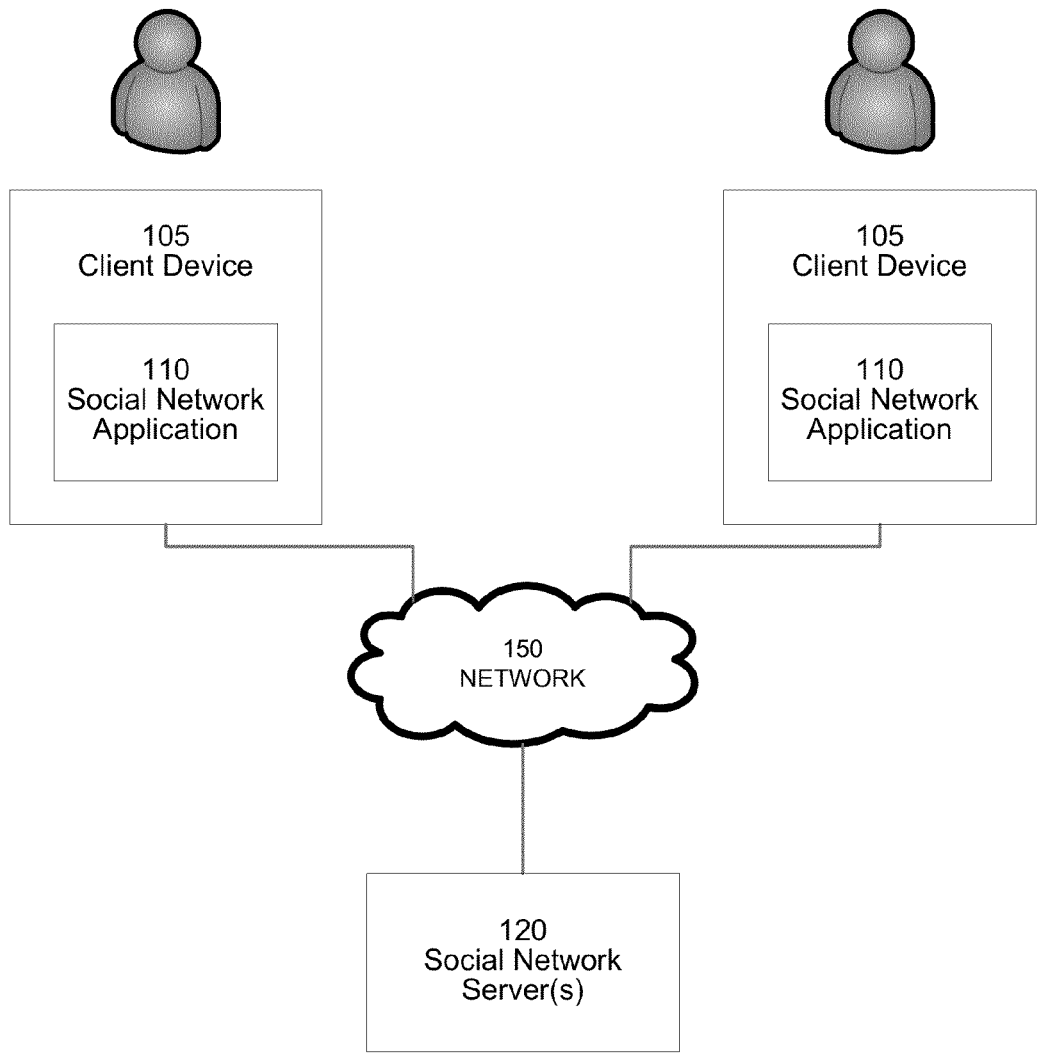
FIG. 1 is a block diagram illustrating an example environment in which notifications in a social network may be provided to a recipient, in accordance with various aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details.

Certain social networking services may provide a user with notifications for various events. The notifications sent to the user may be associated with another entity in the social network. The entity may be, for example, another user, a group, a sender of a message, or a social network account holder that does some action that causes a notification to be generated and sent to a notification recipient (e.g., a user).

For example, the social networking service may generate notifications for when an entity mentions the user in a post, when an entity shares a post or sends a communication directly with the user, when an entity comments on a post of the users, when an entity comments in a post that the user has also commented in, when an entity shares or interacts with a post that the user has also participated in (e.g., indicated approval of). Notifications may also be generated when an entity in a social graph of the user publishes a post, when the user is tagged or otherwise associated with a photo or other piece of media, when a calendar event of the users approaches, or when other events are determined to have occurred.

Other notifications generated in response to events in a social graph are also possible. For example, a social graph belonging to an entity is a set of contacts associated with the entity. Each entity (e.g., a user or account holder) may be associated with one or more social graphs. A social networking service may also provide notifications when one or more entities (e.g., other users or account holders) add the user to a social graph, when entities that the user has added to a social graph also adds the user to a social graph, when entities that the user has invited to join the social networking service join the social networking service.

In some cases, however, the number of notifications may become quite large and identifying notifications of particular interest or importance may be difficult. In accordance with various aspects of the subject technology, systems and methods for prioritizing notifications in a social network are provided. The prioritized notifications may then be displayed or otherwise provided to a recipient (e.g., a user) via a notification interface.

The notifications provided to the recipient may be prioritized such that the most important notifications, the most useful notifications, or the notifications of greatest interest to the recipient may be easily identified (e.g., these notifications may be presented first, in a prioritized area, or with a visual indicator indicating the heightened priority).

FIG. 1 is a block diagram illustrating an example environment 100 in which notifications in a social network may be provided to a recipient, in accordance with various aspects of the subject technology. Although FIG. 1 illustrates a client-server network environment 100, other aspects of the subject technology may include other configurations including, for example, peer-to-peer environments. The network environment includes one or more client devices 105 and one or more social network servers 120 connected via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each client device 105 may be any machine able to communicate with the social network servers 120 via the network 150 and notify a recipient of an incoming message. For example, client device 105 may be a desktop computer, a laptop, a mobile device (e.g., a smart phone, tablet, personal digital assistant (PDA), etc.), or any other machine with a processor, memory, and communications capabilities.

Each client device 105 may also include a social network application 110, such as a web browser or a dedicated program (e.g., an "app" for a mobile device). The social network applications 110 may be configured to enable a user to interact with a social networking service hosted by the social network servers 120 and access the functionalities provided by the social networking service. The social networking applications 110 may also be configured to receive notifications from the social networking service. The notifications may be in the form of a visual notification (e.g., a user interface element displayed on a screen of the client device 105), an audible notification (e.g., a ring or beep), or a haptic notification (e.g., a vibration).

Figure 2:
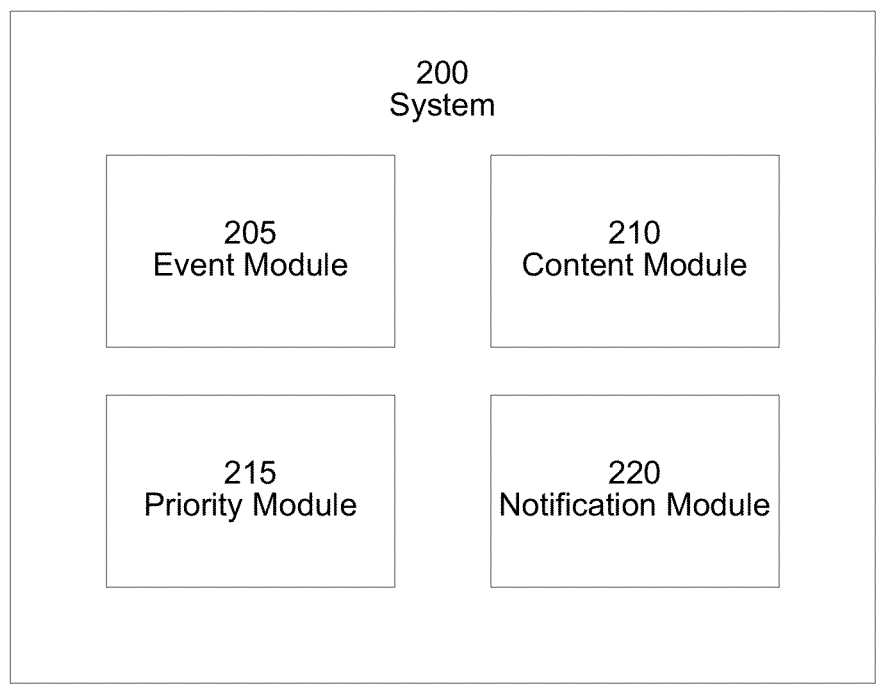
FIG. 2 is a block diagram illustrating an example system configured to provide a user with prioritized notifications, in accordance with various aspects of the subject technology.

The one or more social network servers 120 may be systems or devices having a processor, a memory, and communications capability that may be used host a social network service and transmit notifications to client devices 105. For example, FIG. 2 is a block diagram illustrating an example system 200 configured to provide a user with prioritized notifications, in accordance with various aspects of the subject technology. The system 200 may include an event module 205, a content module 210, a priority module 215, and a notification module 220.

The event module 205 may be configured to determine that one or more events associated with a user that would generate a notification have occurred. For example, the event module 205 may determine that an entity (e.g., another account holder) has mentioned the user in a post, an entity has sent a message to the user, an entity has commented on a post of the users or on a post the user has commented on, the user has been tagged or otherwise associated with a photo or other piece of media, or any other event may have occurred.

After determining that the event occurred, the content module 210 may generate a notification for the event. The notification, as will be illustrated below, may include a description of the event. According to one aspect, these notifications may be stored in a content database until they are delivered to a client device 105.

The priority module 215 may be configured to prioritize the notifications for a user by, for example, calculating a priority score for each notification. The priority score may represent a measure of how important each notification may be to the user. As such, those notifications with high priority scores may be placed in a position or location of greater importance or visibility relative to notifications with lower priority scores.

The priority score may be calculated based on a number of different signals or variables. As will be discussed in further detail below, the priority score may be calculated based on one or more of the following: a timestamp of an event associated with the notification was generated, the type of the event associated with the notification, user information, or entity information for other entities associated with the notification. However, the priority score is not limited to being calculated based on these signals, rather, other signals and variables may also be used.

The notification module 220 may be configured to prioritize the notifications based on the priority score of each notification and generate an interface to be displayed to a recipient (e.g., the user) that includes the prioritized notifications.

According to one aspect, the notifications are prioritized by ordering the notifications based on their respective priority scores and placing the notifications in the interface based on the ordering.

Figure 3:
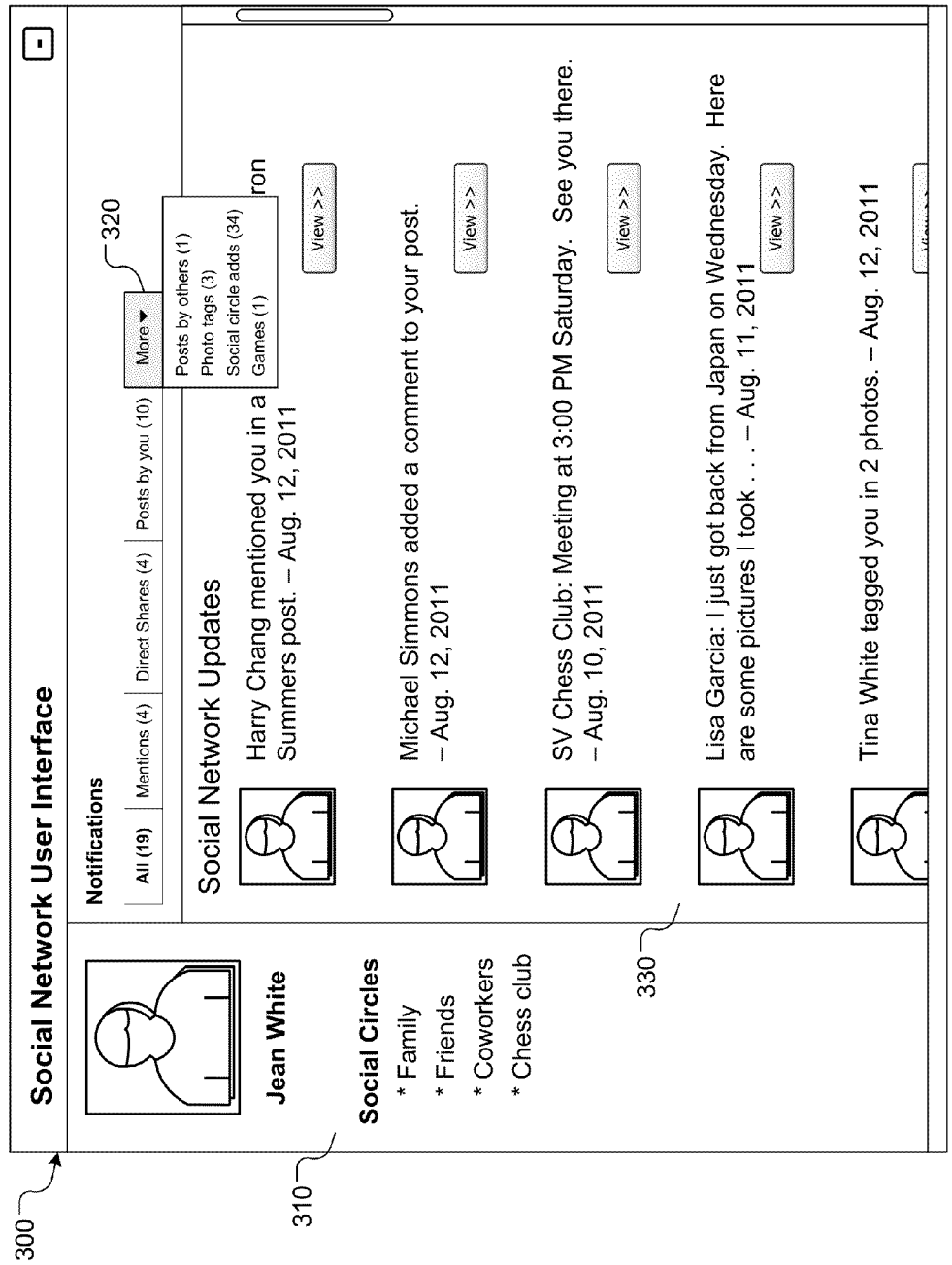
FIG. 3 is an illustration of an example user interface that includes prioritized notifications, according to one aspect of the subject technology.

FIG. 3 is an illustration of an example user interface 300 that includes prioritized notifications, according to one aspect of the subject technology. The user interface 300 may be displayed to a recipient (e.g., a user) on a client device and be in the form of a landing page that includes a number of areas displaying information the social network of the recipient.

The interface 300 includes a user information panel 310 that contains a profile picture for the recipient, the name of the recipient, and a number of the recipient's social graphs. The interface 300 also includes a notification summary bar 320 that includes an overview of the notifications provided to the recipient in the notification interface 330. For example, the notification summary bar 320 may separate the notifications into types of notifications or views and indicate the number of notifications of a particular type or the number of notifications in a particular view that the recipient has. The notification summary bar 320 may also indicate the total number of notifications (e.g., the "All" tab). Each notification view may include one or more categories of notifications that are relevant to the view.

Using the notification summary bar 320 the recipient may also select particular types of notifications or view that the recipient wishes to see in the notification interface 330. For example, the recipient may select the "Mentions" tab in the notification summary bar 320. In response to the recipient selection, the notification interface 330 may display only notifications of the "Mention" type (e.g., posts where the user, Jean White, was mentioned). In other words, notifications that are not of the selected type or not associated with the selected view may be removed from the set of notifications to be displayed in notification interface 330.

The notification interface 330 includes a number of prioritized notifications. According to one aspect, the notifications in the notification interface 330 may be ordered based on their priority scores. In some cases, as may be seen in notification interface 330, the notifications may not be in any chronological order. Instead, the timestamp for the notification may, in some cases, be one of several factors used to calculate the priority score for the notification.

According to some aspects, the priority module 215 may calculate the priority scores for the notifications using a calculation that assigns various weights to various factors or signals. One example calculation may be in the format provided below:

$$\text{Priority Score} = (w1 \cdot f1) + (w2 \cdot f2) + (w3 \cdot f3) \quad \text{Equation (1)}$$

where f1, f2, and f3 are factors and w1, w2, and w3 are weights assigned to the factors. However, other calculations may be used.

According to one aspect, different calculations may be used depending on a view selected by the user. For example, a user may have notifications prioritized based on a first calculation that includes various factors and various weights for those factors when one view is active. Then the user may select another view by selecting a different tab in notification summary bar 320 and, in response to the new view being active, the notifications for the user may be prioritized based on a second calculation based on possibly different weights for various factors. Furthermore, the factors used in the second calculation may be the same or different than the factors used in the first calculation.

The factors used to calculate the priority score for a notification may include how recent the notification event that generated the notification occurred (e.g., the amount of time that has elapsed since the notification event occurred), one or more event types associated with the notification event, or a social affinity score measuring the social affinity between the recipient of the notification and another entity associated with the notification event.

An event type associated with an event in the social network for which a notification is generated may describe a certain characteristic or category of the event. According to some aspects, an event's associated event type may be defined based on, among other things, the form of the event, content associated with the event, a location associated with the event, a prominence level associated with the event, or entities associated with the event and their social affinity with the user.

The form of the event may include, for example, whether the event is a post, a direct message, an endorsement, a comment on a post, an adding of the user or an entity to a group or a list of contacts, or any other event that may generate a notification. Content associated with the event may include, for example, key words or entity names found in a post, a commend, a message. A location associated with the event may include, for example, whether location information (e.g., global positioning system coordinates) have been associated with an event (e.g., a check-in) or whether the event is associated with a particular profile or website on the social networking site (e.g., on the user's profile page or another entity's profile page).

A prominence level associated with the event may be based on, for example, how many comments, endorsements, or re-share actions associated with an event (e.g., a post) or how many entities the event is visible to. The social affinity of entities associated with the event includes which entities are associated with the event and how close the entities are to the user on a social graph.

Possible event types may include, for example, posts by other entities that mention the recipient, messages from other entities directed to the recipient, another entity associating the notification recipient with an image (e.g., tagging the recipient in a photo), other entities commenting in a post published by the recipient, other entities commenting in a post also commented on by the recipient, or another entity adding the notification recipient to a social graph.

According to one aspect, each event type may be associated with a value that may be used to help determine the priority score and certain event types may be associated with a larger value than others. For example, event types for notifications of events where there is a reference to the recipient may be associated with a higher values or may be more heavily weighted than event types for notifications of other events (e.g., events that occur in a game that the recipient is playing) or updates about other entities. These values may be modified from time to time by system administrators depending on how the system administrators choose to alter the notification scheme of the social network.

According to other aspects, notifications associated with certain event types may be removed from the set of notifications to be displayed to a recipient (e.g., a user). For example, these event types may be for events that the recipient has indicated not to display notifications for or for event types that will be displayed in different user interface areas.

The social affinity score may be calculated by the priority module 215 for user notifications that are associated with another entity (e.g., posts by other entities, photo tags of the recipient in another entity's photos, or messages from other entities directed to the recipient) and may represent a measure of how close the entity and the recipient are and how likely the recipient would want to see a notification associated with the entity.

The social affinity score may be calculated based on one or more of the following: information pertaining to the recipient receiving the notification, information pertaining to the entity associated with the notification, or information pertaining to the relationship between the recipient and the entity (e.g., relationship information). Furthermore, the calculation of the social affinity score may be based on other information items such as circumstance information related to the circumstances of the how the recipient is related to the entity (e.g., whether the recipient added the entity to a social graph without any previous contact, in response to being added by the entity to a social graph, whether the relationship was suggested by a mutual contact, etc.).

User information can include any information pertaining to a user (e.g., a notification recipient). For example, user information may include information about a user stored in a user profile, a frequency with which the user has created public posts within the social network, what fraction of the users posts are non-public (e.g., subject to an access control list), or how often the user visits (e.g., logs into) the social network, etc. User information may further include an indication as to how many other entities are already following the user (e.g., receive updates based on the user's activities), how frequently the user has blocked or ignored another entity in the past, or the proportion of total notifications delivered to the user (e.g., from one or more entities) that have resulted in the user also adding the entity to a list of contacts or to a social graph of the user's.

Entity information may include any information pertaining to an entity. For example, entity information may include, but is not limited to, information contained in a user profile for the entity, an indication as to how many times updates associated with the entity have been ignored or blocked in the past, how many times updates associated with the entity have been responded to or reciprocated, or how many contacts the entity has in the social network.

Entity information may also comprise information related to posts or other communications made by the entity. For example, the entity information may include an indication as to how many of the entity's posts have been blocked or flagged by users of the social network or how many of the entity's posts have received responses from other users.

In some aspects, entity information may also be based on an analysis of the information content contained within one or more posts by the entity. By way of example, if a particular entity posts information content that is determined to be undesirable content (e.g., spam or unwanted advertising) this determination may be reflected in the entity information for that particular entity. In another example, the content of the posts may contain key words that are related to a certain topic. The topic information may also be reflected in the entity information for the entity.

Relationship information pertaining to the relationship between the entity and the user (e.g., the notification recipient) may include any type of information, including but not limited to, whether or not the entity and user have a history of interacting with one another (e.g., whether they have ever shared or commented on each others' posts, communicated with one another, or clicked or interacted with each others' posts), whether the user or the entity has the other in a list of contacts (e.g., an address book), whether the user and the entity speak the same language, or whether the user and the entity are located in the same geographic region (e.g., the same neighborhood or neighboring countries, etc.).

In some aspects, information pertaining to the relationship between the entity and the user can also comprise an indication as to whether the user and the entity have contacts in common or whether the user or the entity have interacted with a common contact. As mentioned above, the calculation of the social affinity score may also be based on information related to contextual information such as the circumstances of the entity's inclusion of the user in one or more social graphs associated with the entity or the circumstances of the user's inclusion of the entity in one or more social graphs associated with the user.

According to another aspect of the subject technology, the calculation used to calculate the affinity score between a user and an entity can be updated based on feedback from one or more users. In some implementations, the user feedback can be used to update the prediction model using machine-learning techniques.

User feedback may include any type of information related to user interaction within the social network. In some aspects, user feedback may be based on which posts a user typically interacts with (e.g., comment on, respond to, share with others, etc.). For example, a user may tend to interact more with posts from one or more entities. As a result, future posts from these entities may be prioritized over posts from other entities. A user may also interact more with posts about particular subjects. Accordingly, future posts containing content related to these topics may be prioritized over other posts.

Referring back to FIG. 3, after the priority score for each notification in a set of notifications is calculated, the priority scores may be used to prioritize the set of notifications for display to a recipient (e.g., a user). For example, the notification module 220 may put the notifications into order based on their priority scores and transmit the notifications to a client device 105 so that they may be displayed in notification interface 330.

According to another aspect of the subject technology, a notification with a priority score that exceeds a threshold score may be placed in a prioritized area in the social network user interface 300 and a notification that does not exceed the threshold may be placed in another area of user interface 300. According to still another aspect, a notifications with a priority score that exceeds a threshold score may be displayed along with a visual indicator (e.g., the notification may be highlighted or have a special icon) that indicates to a user that the notification may be of special interest to a user.

Figure 4:
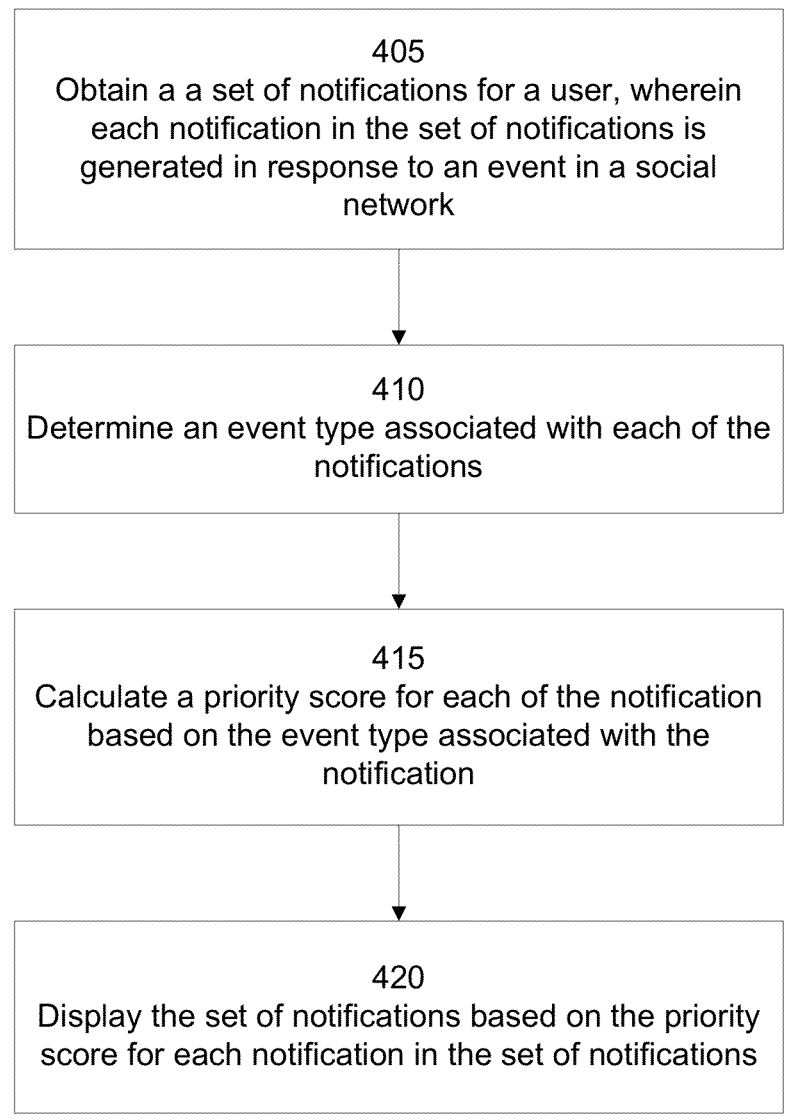
FIG. 4 is a flow chart illustrating an example process for ordering notifications for display in a social networking environment, in accordance with various aspects of the subject technology.

FIG. 4 is a flow chart illustrating an example process 400 for ordering notifications for display in a social networking environment, in accordance with various aspects of the subject technology. Although the operations in process 400 are shown in a particular order, certain operations may be performed in different orders or at the same time. In addition, although the process steps of FIG. 4 are described with reference to FIG. 2, the steps are not limited to being performed by the system of FIG. 2.

The process 400 may begin at 405, when the content module 210 obtains a set of notifications for a recipient (e.g., a user of a social networking service). For example, the content module 210 may retrieve the set of notifications for the recipient from a database or generate notifications for the recipient based on notifications triggering.

According to some aspects, the content module 210 may, for each notification, identify the time the notification triggering event occurred and associate a corresponding timestamp with the notification. At 410, the content module 210 may also determine at least one event type for each notification based on the characteristics or content of the triggering event.

In some cases, certain notifications may be removed from the set of notifications based on the event type of the notification. The notifications associated with these event types may be for events that the recipient has indicated not to display notifications for or for event types that will be displayed in different user interface areas.

At 415, the priority module 215 may calculate a priority score each notification in the set of notifications. The priority score may be calculated based on, for example, the timestamp associated with the notification, any associated event type associated with the notification, or any other information associated with the notification. For example, the priority score may be calculated based on a social affinity score associated with the notification.

After the priority scores for the notifications are calculated, the notification module 220 may display the set of notifications based on their priority scores at 420. As described above, the notifications may be arranged in decreasing order and displayed (e.g., with the notifications with the highest priority scores displayed first) or certain notifications may be displayed in a reserved area or with a visual indicator based on their priority scores.

According to other aspects of the subject technology, the notification module 220 may perform other actions based on the priority scores for the notifications. For example, the notification module 220 may delay transmitting certain notifications to recipients, group certain priority scores together, or use different means of notifying recipients based on the priority scores of the notifications.

Although certain aspects of the subject technology are directed to prioritizing notifications in a social network, other aspects may be directed to prioritizing other types of content items in other contexts.

Figure 5:
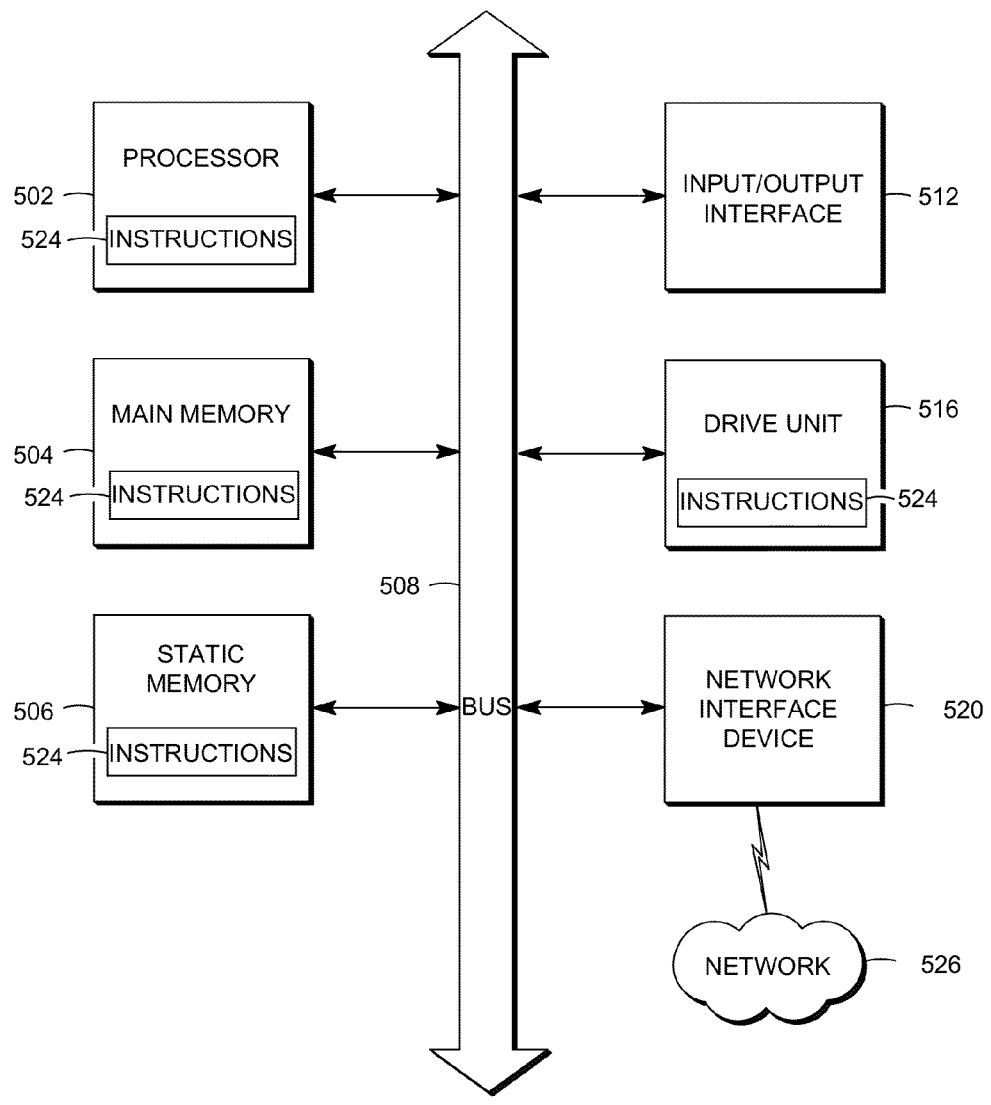
FIG. 5 is a block diagram illustrating an example computer system with which any of the client devices, servers, or systems described may be implemented, in accordance with one aspect of the subject technology.

FIG. 5 is a block diagram illustrating an example computer system with which any of the client devices, servers, or systems described may be implemented, in accordance with one aspect of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The disclosed subject matter relates to systems, methods, and machine-readable media for ordering notifications for display in a social networking environment. For example, a system may be configured to obtaining a set of notifications/posts for a user, calculating a priority score for each notification, and displaying the set of notifications based on the priority score for each notification in the set of notifications. The priority score may be calculated based on factors such as, but not limited to, the timestamp associated with a notification, the event type, or a social affinity score associated with the notification.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs. Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method comprising:
    obtaining a set of notifications for a user, wherein each notification in the set of notifications is generated in response to an event in a social network, wherein at least one notification in the set of notifications is associated with an entity;
    for each notification in the set of notifications:
        determining a relationship information between the user and the entity when the notification is associated with the entity, wherein the relationship information comprises an indication as to whether or not the user has interacted with a post made by the entity;
        determining an event type associated with the notification, and
        calculating a priority score for the notification based on the event type associated with the notification, wherein the priority score is further calculated based on the relationship information when the notification is associated with the entity; and
    displaying the set of notifications based on the priority score for each notification in the set of notifications.

2. The computer-implemented method of claim 1, wherein displaying the set of notifications comprises:
    ranking the set of notifications based on the priority score for each notification; and
    displaying the set of notifications according to the ranking.

3. The computer-implemented method of claim 1, further comprising removing a notification from the set of notifications based on the event type of the notification.

4. The computer-implemented method of claim 1, further comprising:
    calculating a social affinity score for the at least one notification associated with the entity, wherein the social affinity score measures the social affinity between the user and the entity; and
    wherein the priority score for the at least one notification is further calculated based on the affinity score for the notification.

5. The computer-implemented method of claim 4, wherein the social affinity score for the at least one notification is based on at least one of user information, user preferences, and entity information.

6. The computer-implemented method of claim 1, wherein the relationship information comprises an indication as to whether or not the entity has interacted with a post made by the user.

7. The computer-implemented method of claim 5, wherein the relationship information further comprises at least one of a number of contacts the user has with the entity, an indication of whether the user and the entity know each other, whether the user and the entity have similar demographic information.

8. The computer-implemented method of claim 1, wherein the event type is defined based on at least one of a form of the event, content associated with the event, a location associated with the event, a prominence level associated with the event, or a social affinity level.

9. A system comprising:
one or more processors; and
a machine-readable medium comprising instructions stored therein, which when executed by the one or more processors, cause the one or more processors to perform operations comprising:
obtaining a first content item and a second content item for a user, the first content item associated with a first entity;
determining a first event type associated with the first content item based on a first event in a social network;
determining a second event type associated with the second content item based on a second event in the social network;
determine a first relationship information between the user and the first entity, wherein the first relationship information comprises an indication as to whether or not the user has interacted with a post made by the first entity;
comparing the first event type for the first content item with the second event type for the second content item;
prioritizing the first content item and the second content item based on the comparing and the first relationship information; and
displaying the first content item and the second content item based on the prioritizing.

10. The system of claim 9, wherein the first content item and the second content item are notifications.

11. The system of claim 9, wherein the prioritizing of the first content item and the second content item comprises calculating a priority score for the first content item and the second content item.

12. The system of claim 11, wherein the second content item is associated with a second entity and wherein the operations further comprise:
calculating an affinity score for the second content item that measures the social affinity between the user and the second entity; and
wherein the priority score for the second content item is calculated based on the affinity score for the second content item.

13. The system of claim 12, wherein the affinity score is based on at least one of user information, user preferences, entity information, and a second relationship information between the user and the second entity.

14. The system of claim 9, wherein the operations further comprise:
determining that the first event and the second event in the social network have occurred; and
generating the first content item and the second content item in response to the determining.

15. A machine-readable medium comprising instructions stored therein, which when executed by a machine, cause the machine to perform operations comprising:
obtaining a set of notifications for a user, wherein each notification in the set of notifications is associated with a social affinity score, wherein the social affinity score of at least one notification in the set of notifications is based on whether or not the user has interacted with a post made by an entity associated with the at least one notification;
prioritizing the set of notifications based on the social affinity score associated with each notification in the set of notifications; and
generating, based on the prioritizing of the set of notifications, an interface comprising the set of notifications.

16. The machine-readable medium of claim 15, further configured to perform the operations comprising:
determining that a notification triggering event associated with the user has occurred;
generating a notification for the notification triggering event; and
including the notification in the set of notifications for the user.

17. The machine-readable medium of claim 15, further configured to perform the operations comprising:
calculating the affinity score for each notification in the set of notifications.

18. The machine-readable medium of claim 15, wherein each notification in the set of notifications is associated with a timestamp and an event type and wherein the priority score is further calculated based on at least one of the timestamp and the event type associated with the notification.

\* \* \* \* \*